(12) United States Patent
Felch et al.

(10) Patent No.: US 8,501,149 B2
(45) Date of Patent: Aug. 6, 2013

(54) $H_2S$ CONVERSION TO SULFUR USING A REGENERATED IODINE SOLUTION

(75) Inventors: Chad L. Felch, Kronenwetter, WI (US); Matthew Patterson, Hatley, WI (US); Bryan J. Kumfer, Ringle, WI (US); Timothy J. Schleusner, Kronenwetter, WI (US); Richard Kelso Kerr, Calgary (CA)

(73) Assignee: Siemens Energy, Inc., Orlando, FL (US)

( * ) Notice: Subject to any disclaimer, the term of this patent is extended or adjusted under 35 U.S.C. 154(b) by 0 days.

(21) Appl. No.: 13/398,918

(22) Filed: Feb. 17, 2012

(65) Prior Publication Data

US 2012/0213694 A1    Aug. 23, 2012

Related U.S. Application Data

(60) Provisional application No. 61/444,383, filed on Feb. 18, 2011.

(51) Int. Cl.
*C01B 17/04*     (2006.01)
*B01D 53/74*     (2006.01)
*B01J 19/00*     (2006.01)

(52) U.S. Cl.
USPC ........................................ 423/573.1; 422/187

(58) Field of Classification Search
USPC .................................. 423/573.1; 422/105, 187
See application file for complete search history.

(56) References Cited

U.S. PATENT DOCUMENTS

| | | | |
|---|---|---|---|
| 3,607,004 A * | 9/1971 | Deschamps et al. | 423/224 |
| 3,607,925 A | 9/1971 | Boichard et al. | |
| 3,716,620 A | 2/1973 | Deschamps et al. | |
| 3,912,626 A | 10/1975 | Ely et al. | |
| 4,066,739 A * | 1/1978 | Chen | 423/571 |
| 4,094,780 A | 6/1978 | Iwai et al. | |
| 4,094,962 A | 6/1978 | Cocuzza et al. | |
| 4,141,828 A | 2/1979 | Okada et al. | |
| 4,214,982 A | 7/1980 | Pfalzer | |
| 4,220,505 A | 9/1980 | Deem | |
| 4,234,423 A | 11/1980 | Moore et al. | |
| 4,265,747 A | 5/1981 | Copa et al. | |
| 4,294,720 A | 10/1981 | Visser et al. | |
| 4,537,835 A * | 8/1985 | Rohrmann et al. | 423/502 |
| 4,626,354 A | 12/1986 | Hoffman et al. | |

(Continued)

FOREIGN PATENT DOCUMENTS

| EP | 0368834 A1 | 5/1990 |
|---|---|---|
| EP | 1457268 A2 | 9/2004 |

(Continued)

OTHER PUBLICATIONS

Lurye Yu., Spravochnik po analiticheskoy khimii, Moscow, Khimiya, 1989, p. 297, table (no translation available).

(Continued)

*Primary Examiner* — Timothy Vanoy

(57) ABSTRACT

Systems and methods of removing sulfur from a gas stream comprising hydrogen sulfide ($H_2S$) are provided. The systems and methods may utilize iodine to remove sulfur from the gas stream. In certain systems and methods, the iodine may be regenerated. In particular, the present systems and methods may be capable of reducing sulfur content in a gas stream comprising hydrogen sulfide $H_2S$ gas to levels that are undetectable.

20 Claims, 6 Drawing Sheets

U.S. PATENT DOCUMENTS

| | | | |
|---|---|---|---|
| 4,749,492 A | 6/1988 | Berrigan, Jr. et al. | |
| 4,778,598 A | 10/1988 | Hoffman et al. | |
| 4,810,386 A | 3/1989 | Copa et al. | |
| 4,897,196 A | 1/1990 | Copa et al. | |
| 4,970,005 A | 11/1990 | Schuchardt | |
| 5,019,227 A * | 5/1991 | White et al. | 205/617 |
| 5,080,792 A | 1/1992 | McGovern et al. | |
| 5,082,571 A | 1/1992 | Beula et al. | |
| 5,145,587 A | 9/1992 | Ishii et al. | |
| 5,240,619 A | 8/1993 | Copa et al. | |
| 5,244,576 A | 9/1993 | DeRoeck et al. | |
| 5,268,104 A | 12/1993 | Masoomain | |
| 5,298,174 A | 3/1994 | Momont et al. | |
| 5,358,646 A | 10/1994 | Gloyna et al. | |
| 5,368,726 A | 11/1994 | Masoomian | |
| 5,407,584 A | 4/1995 | Broussard, Sr. | |
| 5,620,606 A | 4/1997 | McBrayer, Jr. et al. | |
| 5,641,413 A | 6/1997 | Momont et al. | |
| 5,707,530 A | 1/1998 | Broussard, Jr. | |
| 5,720,889 A | 2/1998 | McBrayer, Jr. et al. | |
| 5,885,422 A | 3/1999 | Kurukchi et al. | |
| 5,891,346 A | 4/1999 | Huntley | |
| 6,110,385 A | 8/2000 | Copa et al. | |
| 6,210,583 B1 | 4/2001 | Kurukchi et al. | |
| 6,375,907 B1 * | 4/2002 | Gallup | 423/571 |
| 6,395,188 B1 | 5/2002 | Burdeniuc et al. | |
| 6,398,959 B1 | 6/2002 | Teran et al. | |
| 6,444,130 B1 | 9/2002 | Manganaro et al. | |
| 7,172,701 B2 | 2/2007 | Gaid et al. | |
| 7,993,588 B2 | 8/2011 | Felch et al. | |
| 2005/0171390 A1 | 8/2005 | Felch et al. | |
| 2006/0060541 A1 | 3/2006 | Abazajian | |
| 2008/0078724 A1 | 4/2008 | Felch et al. | |
| 2008/0078725 A1 | 4/2008 | Felch et al. | |
| 2011/0210079 A1 | 9/2011 | Felch et al. | |

FOREIGN PATENT DOCUMENTS

| | | |
|---|---|---|
| EP | 1647529 A1 | 4/2006 |
| FR | 2064785 A6 | 7/1971 |
| GB | 2423490 | 5/2009 |
| JP | 61257291 A | 11/1986 |
| SU | 618922 A1 | 8/1981 |
| SU | 912232 A1 | 3/1982 |
| WO | 03045525 A1 | 6/2003 |
| WO | 2006010218 A1 | 2/2006 |

OTHER PUBLICATIONS

Mehra, A., et al., "Adsorption of Hydrogen Sulfide in Aqueous Solutions of Iodides Containing Dissolved Iodine: Enhancements in Rates Due to Precipitated Sulfer," Chemical Engineering Science, vol. 43, No. 5, pp. 1071-1081, 1988, pp. 1071-1081.

Wubs, "Absorption of hydrogen sulfide in aqueous solutions of iodine—a critical review," Chemical Engineering Science, vol. 46, No. 2, 1991, pp. 703-706.

* cited by examiner

# H₂S CONVERSION TO SULFUR USING A REGENERATED IODINE SOLUTION

CROSS-REFERENCE TO RELATED APPLICATIONS

This application claims the benefit of U.S. Application No. 61/444,383 filed Feb. 18, 2011, the entire contents and substance of which is hereby incorporated by reference in its entirety.

FIELD OF THE DISCLOSURE

The present invention generally relates to systems and methods of removing sulfur from a gas stream comprising hydrogen sulfide ($H_2S$) using an iodine solution. In certain systems and methods, the iodine solution is regenerated. In particular, the present systems and methods are capable of reducing sulfur content in a gas stream comprising hydrogen sulfide $H_2S$ gas to levels that are undetectable.

SUMMARY OF THE DISCLOSURE

In accordance with one or more embodiments, the invention relates to a method for treating hydrogen sulfide gas. The method may comprise reacting hydrogen sulfide gas with iodine to produce a stream comprising iodide and sulfur, removing sulfur from the stream to produce a separated stream comprising iodide, and reacting the separated stream comprising iodide with a source of oxygen under aqueous conditions and at a predetermined temperature and a predetermined pressure to produce a stream comprising iodine.

In certain embodiments, the method may further comprise recovering at least a portion of the iodine from the stream comprising iodine. In at least one embodiment, the method may further comprise introducing at least a portion of the regenerated iodine to the hydrogen sulfide gas.

In certain embodiments, the method further comprises recovering elemental sulfur from the stream comprising iodide and sulfur. In certain aspects, the method may use air as the source of oxygen. In another aspect, the method may use a predetermined temperature in a range of from about 75° C. to about 260° C. In at least one embodiment, the method may use a predetermined temperature in a range of from about 120° C. to about 175° C.

In at least one aspect, the method may use a predetermined pressure in a range of from about 25 psi to about 2000 psi. In yet another aspect, the method may use a predetermined pressure in a range of from about 100 psi to about 400 psi. In certain aspects, the method may further comprise reacting the separated stream comprising iodide with a source of oxygen under aqueous conditions for a time period in a range of from about 15 minutes to about 120 minutes. In at least one aspect, the method may further comprise reacting the separated stream comprising iodide with a source of oxygen under aqueous conditions for a time period of less than about 15 minutes.

In another aspect, the method further comprises recovering thermal energy from the stream comprising iodine.

In accordance with one or more embodiments, the invention relates to a system for treating hydrogen sulfide gas. The system may comprise a contactor fluidly connected to a source of hydrogen sulfide gas and a source of iodine, a separator fluidly connected downstream from the contactor and configured to separate elemental sulfur and iodide, and a reactor fluidly connected downstream from the separator and the separated iodide and fluidly connected to a source of oxygen.

In certain embodiments, the system may further comprise a control system configured to regulate a predetermined temperature and predetermined pressure of the reactor. In certain aspects, the system may further comprise at least one scrubber that may be fluidly connected downstream from the reactor and upstream from the source of iodine. In another aspect, the system may further comprise at least one energy recovery device fluidly connected downstream from the reactor and upstream from the contactor and configured to recover thermal energy from the reactor. In certain aspects, the system may further comprise a reactor outlet fluidly connected upstream from the contactor and configured to transfer at least a portion of regenerated iodine from the reactor to the contactor. In at least one embodiment, the system may have a rate of regeneration from iodide to regenerated iodine from the reactor of at least 50%. In certain embodiments, the system further comprises a scrubber fluidly connected downstream from the reactor and configured to transfer at least a portion of regenerated iodine from the reactor to the contactor.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
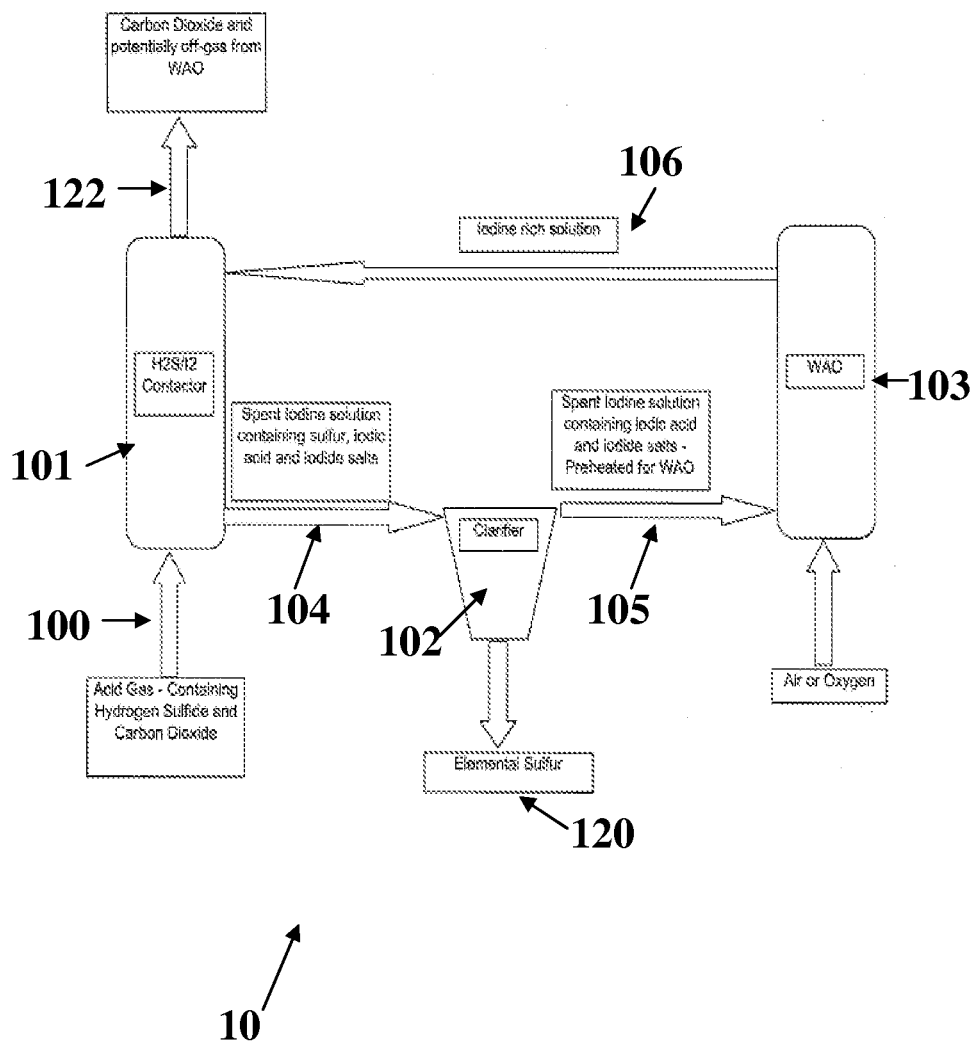
FIG. 1 is a schematic drawing of a process flow diagram in accordance with one or more aspects of the disclosure.

The systems and methods described herein are not limited in their application to the details of construction and the arrangement of components set forth in the description or illustrated in the drawings. The invention is capable of other embodiments and of being practiced or of being carried out in various ways. Also, the phraseology and terminology used herein is for the purpose of description and should not be regarded as limiting. The use of "including," "comprising," "having," "containing," "involving," "having," "containing," "characterized by," "characterized in that," and variations thereof herein is meant to encompass the items listed thereafter, equivalents thereof, as well as alternate embodiments consisting of the items listed thereafter exclusively. Use of ordinal terms such as "first," "second," "third," and the like in the claims to modify a claim element does not by itself connote any priority, The modifier "about" used in connection with a quantity is inclusive of the stated value and has the meaning dictated by the context (for example, it includes at least the degree of error associated with the measurement of the particular quantity). When used in the context of a range, the modifier "about" should also be considered as disclosing the range defined by the absolute values of the two endpoints. For example, the range "from about 2 to about 4" also discloses the range "from 2 to 4."

As used herein, the terms "iodine species," "iodine solution," and "iodine-rich solution," can refer to iodine in at least one of its various forms, including diatomic iodine or elemental iodine ($I_2$), iodide ($I^-$), triiodide ($I_3^-$), and iodate ($IO_3^-$).

As used herein, the terms "iodine," "elemental iodine," "molecular iodine," or "free iodine" refers to the diatomic molecule $I_2$.

As used herein, the term "iodide," "iodide ion," or "iodide anion" refers to the species that is represented by the chemical symbol $I^-$. Suitable counter-ions for the iodide anion include sodium, potassium, calcium and the like.

Elemental iodine is soluble in most organic solvents, but is only slightly soluble in water. The solubility increases by the presence of the iodide ion. Molecular iodine reacts reversibly with the negative ion, generating triiodide anion $I_3^-$ in equilibrium, which is soluble in water. The reaction for formation of the iodide complex is as follows:

$$I_2 + I^- \leftrightarrows I_3^-$$

As used herein, the terms "$I_3^-$," "$I_3^-$ complex," or "triiodide" refer to the ion formed from the reversible reaction between $I_2$ and $I^-$.

As used herein, the term "iodate" or "iodate anion," refers to the species that is represented by the chemical formula $IO_3^-$. Suitable counter-ions for the iodate anion include sodium, potassium, calcium and the like.

As used herein, the term "acid gas" refers to a gas mixture which contains significant amounts of $H_2S$, carbon dioxide ($CO_2$), or similar contaminants.

As used herein, the terms "separator" or "clarifier" refer to any suitable apparatus for performing a separation process on a multi-phase fluid into separate phases. For example, a separator may comprise a device that separates a two-phase liquid/solid fluid into separate liquid and solid phases. Separators may separate fluids or solids, or fluids from solids.

As used herein, the term "oxidation" refers to a reaction in which the atoms in an element lose electrons and the valence of the element is correspondingly increased.

$H_2S$ is a common byproduct of processing natural gas and refining high-sulfur crude oils. This may be largely due to the fact that sulfur must be removed from fuels in order to meet environmental regulations and minimize corrosion in an internal combustion engine due to sulfur oxide ($SO_x$) production. The term $SO_x$ as used herein refers to the species $SO_2$ and $SO_3$. The most common method of handling the $H_2S$ stream is to produce elemental sulfur via the Claus process. The basic Claus unit comprises a thermal stage and two or more catalytic stages. Some of the $H_2S$ in the feed gas is thermally converted to $SO_2$ in the reaction furnace of the thermal stage according to reaction (2) below. The remaining $H_2S$ is then reacted with the thermally produced $SO_2$ to form elemental sulfur in the thermal stage and the subsequent catalytic stages according to reaction (1) below. The catalyst is typically alumina, although other catalysts may be used.

The basic chemical reactions occurring in a Claus process are represented by the following reactions:

$$2H_2S + SO_2 \rightarrow 3S + 2H_2O \quad (1)$$

To provide the proper ratio of components, the first step in the Claus process is the combustion of ⅓ of the $H_2S$ in the feed gas:

$$H_2S + 1.5O_2 \rightarrow SO_2 + H_2O \quad (2)$$

Combining equations (1) and (2), the overall process reaction is:

$$2H_2S + O_2 \rightarrow 2S + 2H_2O \quad (3)$$

The Claus process is estimated to only be about 95-98% efficient at sulfur removal. The Claus plant tail gas is routed either to a tail gas treatment unit for further processing, or to a thermal oxidizer (incinerator) to incinerate all of the sulfur compounds in the tail gas to $SO_2$ before dispersing the effluent to the atmosphere. The incineration process is a very energy intensive step and causes the release of a significant amount of $SO_x$ to the environment.

A Claus system at a petrochemical refinery can produce more than 500 tons of sulfur per day. Since the process is only about 95-98% efficient, about 2-5%, or about 10-30 tons per day of $SO_2$, a major source of acid rain, is released to the environment. Regulations in certain jurisdictions require minimum sulfur removal levels of 98.8-99.8% or above, which requires the installation of a tail gas treatment unit downstream of the Claus plant and upstream of the incinerator.

Wet Air Oxidation (WAO) is a technology that has been adopted in the treatment of process streams, and is widely used, for example, to remove pollutants in wastewater. In certain applications, WAO can be used to recover and regenerate chemicals for re-use. The method of wet oxidation involves the aqueous phase oxidation of a target constituent by an oxidizing agent, for example, molecular oxygen from an oxygen-containing gas such as air, at elevated temperatures and pressures.

As used herein, the terms "wet air oxidation" (WAO) and "wet oxidation" (WO) are used interchangeably, and in general refer to the oxidation of soluble or suspended components in an aqueous environment using oxygen as the oxidizing agent. When air is used as the source of oxygen, the process is often referred to as wet air oxidation. When pure oxygen is the source of oxygen, the process is often referred to as wet oxidation.

Iodine is a mild oxidant that is capable of converting $H_2S$ to sulfur. The reaction of $H_2S$ with iodine to form elemental sulfur and iodic acid (HI) may be used as a method to prepare HI. WAO may then be used to oxidize the iodide to iodine. The resulting system produces elemental sulfur and regenerated iodine. The chemistry of the two reactions is:

$$H_2S + I_2 \rightarrow S + 2HI \quad (I)$$

$$2HI + \tfrac{1}{2}O_2 \rightarrow I_2 + H_2O \quad (II)$$

The sulfur generation reaction (reaction I) may be completed, for example, by introducing $H_2S$ gas or a gas stream comprising $H_2S$ to a contactor or scrubber containing an iodine-rich solution. The $I_2$ reacts with $H_2S$, producing a solution comprising elemental sulfur, iodic acid, and possibly, other iodide salts, such as potassium iodide (KI) and (NaI).

The iodine regeneration reaction (reaction II) may be completed, for example, by using WAO reaction techniques, where an oxygen-rich gas may be introduced to a reactor under predetermined temperatures and predetermined pressures to convert the iodide to iodine.

Reactions (I) and (II) are exothermic, which may allow for opportunities to recover energy in the form of heat.

In accordance with one or more embodiments, the invention relates to one or more systems and methods of treating hydrogen sulfide gas. In certain embodiments, the system may receive one or more feed streams comprising $H_2S$. In certain aspects, the system may receive one or more $H_2S$ feed streams from industrial sources. For example, the $H_2S$ feed stream may originate from a chemical processing facility or oil refinery. As used herein, the term "$H_2S$ feed stream" refers to any composition that comprises $H_2S$, such as, for example, acid gas and sour gas.

In certain embodiments, the $H_2S$ feed stream may be in the form of acid gas. In certain aspects, acid gas has a composition that is in a range of from about 60 to about 70% $H_2S$ and from about 30 to about 40% $CO_2$. In other aspects, acid gas has a composition of about 67% $H_2S$ and about 33% $CO_2$. In certain embodiments, acid gas has a composition of about 66% $H_2S$ and about 34% $CO_2$. In other non-limiting embodiments, the acid gas has a composition of about 60% $H_2S$ and about 40% $CO_2$.

In certain embodiments, the $H_2S$ feed stream may be in the form of sour gas. As used herein, the term "sour gas" refers to natural gas that comprises $H_2S$.

In certain exemplary embodiments, the $H_2S$ feed stream may further comprise water. In certain non-limiting embodiments, the $H_2S$ feed stream may be pre-treated before being introduced to the process system. For example, the $H_2S$ feed stream may be pre-heated. A source of $H_2S$ feed stream may take the form of direct piping from at least one of a plant, process, or holding vessel.

In one or more embodiments, hydrogen sulfide gas may be reacted with iodine. In certain non-limiting embodiments, the system may receive at least a portion of iodine in the form of regenerated iodine from a wet oxidation process. In certain embodiments, the system may receive at least a portion of iodine in the form of iodine species, for example, the $I_3^-$ complex. In certain embodiments, the system may receive at least a portion of iodine in the form of iodine solution comprising iodine ($I_2$) and iodide ($I^-$). In various embodiments, the system may receive at least a portion of iodine in the form of iodine solution comprising iodine ($I_2$), iodide ($I^-$), and triiodide ($I_3^-$). In certain aspects, the source of iodide may be HI. In certain embodiments, the system may receive at least a portion of iodine in the form of regenerated iodine from a scrubbing process. In certain embodiments, at least a portion of the iodine solution may be pre-treated before being introduced to the process system. For example, the iodine solution may be pre-heated or filtered. A source of iodine or iodine solution to be introduced to the system may take the form of direct piping from a plant, process, or holding vessel. In certain embodiments, the source of iodine or iodine solution may be from a holding vessel that may be blanketed with nitrogen gas.

Although the description exemplifies the use of iodine to react with $H_2S$ and produce sulfur, it is within the scope of the methods and systems described here to use other suitable compounds that are capable of functioning as oxidizers and being regenerated, for example, by a wet oxidation process. Non-limiting examples of other compounds that may be suitable to use include, but are not limited to, chlorine, bromine, manganese, vanadium, and fluorine.

In accordance with one or more embodiments, hydrogen sulfide gas may be reacted with iodine in a contactor. As used herein, the terms "contactor" or "impinger" refer to any suitable apparatus in which two phases can be brought into contact with one another in either co-current or countercurrent flow for purposes of conducting a reaction. The device may be constructed as a column that may further comprise suitable components, for example, at least one of baffles and packing, to improve at least one of mass transfer, heat exchange, and reaction kinetics. As used herein, the term "baffle" may refer to a device that regulates the flow of a fluid. In certain embodiments, the contactor may be constructed and arranged to allow separation of gas and liquid phases. In certain aspects, the residence time for at least one gas in the contactor is from about 1 to about 10 minutes. In at least one aspect, the residence time for a liquid in the contactor is from about 1 to about 120 minutes. In a different aspect, the residence time for a liquid in the contactor is from about 1 to about 10 minutes. In certain embodiments, the contactor may be fluidly connected to a source of steam.

In certain embodiments, the hydrogen sulfide gas may be reacted with iodine at a temperature and pressure sufficient for the hydrogen sulfide to be converted to elemental sulfur. For example, the hydrogen sulfide gas may be reacted with iodine at a temperature that is sufficient to keep sulfur in the liquid phase. In addition, the hydrogen sulfide gas may be reacted with iodine at a temperature that is above the melting point of sulfur and iodine but below the temperature at which sulfur becomes viscous. In certain embodiments, the temperature may be in a range of from about 15° C. to about 260° C. In certain other embodiments, the temperature may be in a range of from about 120° C. to about 175° C. In certain embodiments, the hydrogen sulfide gas may be reacted with iodine at a pressure in a range of from about 25 psi to about 2000 psi. In certain embodiments, the hydrogen sulfide gas may be reacted with iodine at a pressure in a range of from about 100 psi to about 400 psi.

In accordance with one or more embodiments, the percent sulfur removed from the $H_2S$ feed stream may be in a range of from about 90% to about 100%. In certain embodiments, the percent sulfur removed from the $H_2S$ feed stream may be in a range of from about 95% to about 100%. In certain embodiments, the percent sulfur removed from the $H_2S$ feed stream may be in a range of from about 97% to about 100%. In certain embodiments, the percent sulfur removed from the $H_2S$ feed stream may be at least about 99%.

In certain embodiments, the reaction between hydrogen sulfide gas and iodine produces a stream comprising one or more phases or components. The reaction may comprise a first phase that may be a gas or an off-gas. In at least one embodiment, the first phase may be transferred from the contactor. In one or more aspects, the first phase may comprise water vapor. In certain embodiments, the first phase comprising water vapor may be transferred to a condensor. In certain embodiments, the condensor may condense the transferred water vapor into liquid water. In certain other embodiments, the first phase may comprise iodine. In various embodiments, the first phase may comprise iodine solution comprising iodine ($I_2$), iodide ($I_2^-$), and triiodide ($I_3^-$). In at least one embodiment, the first phase comprising iodine or iodine solution may be transferred to a scrubber. In certain embodiments, iodine may be regenerated from the first phase comprising iodine or iodine solution by treating it with a scrubber. In other embodiments, the regenerated iodine from the first phase and treated by the scrubber may be re-introduced to the process system as a source of regenerated iodine. In certain embodiments, the first phase may comprise $CO_2$. In certain embodiments, the first phase comprising $CO_2$ may be transferred to a cooler. In at least one aspect, the first phase may comprise small concentrations of impurities contained in the original $H_2S$ feed stream.

In at least one embodiment, the reaction between hydrogen sulfide gas and iodine may produce a stream comprising a second phase. In certain aspects, the second phase may be a fluid comprising a liquid and a solid. In certain embodiments, the hydrogen sulfide gas may be reacted with iodine to produce a stream comprising iodide and sulfur. In certain aspects, the hydrogen sulfide gas may be reacted with iodine to produce a stream comprising iodide, sulfur, and sulfuric acid. In one or more aspects, the stream may comprise iodide in the liquid phase and sulfur in the solid phase. In certain aspects, the stream may comprise at least one of sulfur, sulfuric acid, iodine, iodic acid, and iodide salts. In certain other aspects, the stream may comprise sulfur in the solid phase and at least one of iodine, iodic acid, and iodide salts in the liquid phase.

In accordance with one or more embodiments, the method for treating hydrogen sulfide gas may further comprise removing sulfur from the stream comprising iodide and sulfur. In certain aspects, the sulfur may be separated from the stream using a separator. In certain embodiments, the separator may be connected downstream from the contactor. In certain aspects, the separator may separate two liquid phases. In other aspects, the separator may separate a solid from a liquid phase. In at least one aspect, the separator may separate sulfur in the solid phase from iodide in the liquid phase. In certain aspects, the recovered sulfur may be pure enough to be a viable commercial product that may be further processed onsite or offsite and sold.

In at least one aspect, the method for treating hydrogen sulfide gas may further comprise recovering or removing water from the contactor. The recovered water may be recovered in the gas or liquid phase. The recovered water may be recovered in the gas phase and further condensed to the liquid phase. The recovered water may be sold or used for further process treatments.

In accordance with one or more embodiments, the method for treating hydrogen sulfide gas may further comprise removing sulfur from the stream comprising iodide and sulfur to produce a separated stream comprising iodide. In at least one aspect, the separated stream may comprise iodine, iodic acid, and iodide salts. In various embodiments, the separated stream may comprise iodine species, iodic acid, and iodide salts. In certain aspects, the separator may be configured to separate elemental sulfur and iodide. In other aspects, the method may further comprise recovering elemental sulfur from the stream comprising sulfur and iodide. In at least one aspect, the solution may contain at least about 67% of the total I⁻ as HI. In certain embodiments, the separated stream may comprise less than about 10 mg/L of sulfur.

As previously mentioned, reactions (I) and (II) are exothermic, which may allow for opportunities to recover thermal energy in the form of heat. Some aspects of the methods and systems disclosed herein may involve transferring at least a portion of heat from one or more streams coming from one or more process components to one or more streams going to one or more other process components. For example, one or more embodiments may include at least one energy recovery device in fluid communication with the reactor for the purposes of capturing thermal energy from the wet oxidation reaction. In addition, one or more embodiments may include at least one energy recovery device in fluid communication with at least one of the contactor and separator for the purposes of capturing thermal energy from the reaction between hydrogen sulfide and iodine. One or more embodiments may include at least one energy recovery device in fluid connection between a stream coming from the reactor and going to the contactor. In at least one aspect, thermal energy may be recovered from the stream comprising iodide. In certain embodiments, energy may be recovered from one or more reactions, streams, or components of the process to be used in another related or unrelated to the processes disclosed herein.

In accordance with one or more embodiments, the method for treating hydrogen sulfide gas may further comprise reacting the separated stream comprising iodide in a wet oxidation process. The separated stream comprising iodide may be oxidized with an oxidizing agent. The oxidizing agent may be oxygen-containing gas, for example, air, oxygen-enriched air, or pure oxygen. As used herein, the phrase "oxygen-enriched air" is defined as air having oxygen content greater than about 21%. In certain embodiments, the separated stream comprising iodide may be oxidized with a source of oxygen under aqueous conditions. In at least one embodiment, the separated stream comprising iodide may be preheated.

In certain embodiments, the separated stream comprising iodide may be reacted with a source of oxygen under aqueous conditions in a reactor. As used herein, the term "reactor" may refer to any suitable device in which a chemical reaction occurs. In certain aspects the reactor may be fluidly connected downstream from the separator and the separated iodide. In at least some aspects, the reactor may be fluidly connected to a source of oxygen. In at least one aspect, the source of oxygen may be supplied to the reactor in pressurized form. The reactor may be configured for batch or continuous flow processes. The reactor may be constructed as a column that may further comprise suitable components, for example, at least one of baffles and packing, to improve at least one of mass transfer, heat exchange, and reaction kinetics. In certain embodiments, the reactor may be constructed and arranged to allow separation of gas and liquid phases. In certain non-limiting embodiments, the reactor may be fluidly connected to a source of steam. In other embodiments, the reactor may be fluidly connected to a source of air. In certain embodiments, the reactor may be fluidly connected to a source of pure oxygen.

In certain embodiments, the iodide may be reacted with a source of oxygen under aqueous conditions and a predetermined temperature and a predetermined pressure to allow for the conversion of iodide to iodine. In certain embodiments, the predetermined temperature may be in a range of from about 75° C. to about 260° C. In certain aspects, the predetermined temperature may be in a range of from about 120° C. to about 175° C. In certain embodiments, the predetermined pressure may be in a range of from about 25 psi to about 2000 psi. In certain embodiments, the predetermined pressure may be in a range of from about 100 psi to about 400 psi. In at least one aspect, the separated stream comprising iodide may be reacted with a source of oxygen under aqueous conditions for a time period in a range of from about 15 minutes to about 120 minutes. In certain embodiments, the separated stream comprising iodide may be reacted with a source of oxygen under aqueous conditions for a time period to allow for the conversion of iodide to iodine. In certain embodiments, the time period may be in a range of from about 15 minutes to about 30 minutes. In at least one aspect, the separated stream comprising iodide may be reacted with a source of oxygen under aqueous conditions for a time period of less than about 15 minutes.

In accordance with one or more embodiments, the separated stream comprising iodide may be reacted with a source of oxygen under aqueous conditions and at a predetermined temperature and a predetermined pressure to produce a stream comprising iodine. In certain non-limiting embodiments, at least a portion of the iodine from the stream comprising iodine may be regenerated. In at least one aspect, the stream comprising iodine comprises iodine species. In certain aspects, at least a portion of the regenerated portion of the iodine from the stream comprising iodine may be introduced to the hydrogen sulfide gas. In at least one embodiment, a reactor outlet may be fluidly connected upstream from the contactor. In certain embodiments, the reactor outlet may be configured to transfer at least a portion of regenerated iodine from the reactor to the contactor. In certain aspects, at least a portion of the regenerated portion of the iodine from the stream comprising iodine may be introduced to the process system as a source of regenerated iodine.

In at least one embodiment, the rate of regeneration from iodide to regenerated iodine from the reactor is at least 50%. This level of regeneration is considered surprising and unexpected, since oxidation reactions are typically considered to be destructive techniques, capable of destroying one or more chemical bonds in liquid and gas phases. Accordingly, the systems and methods of the present disclosure provide for cost savings, related to the unexpected ability to regenerate and re-use iodine in the process.

In contrast to a wet oxidation process, the Fenton reaction is a catalytic method based on the generation of highly reactive hydroxyl radicals from hydrogen peroxide in the presence of a metallic ion, commonly Fe(II), or other low valence transition metals, Fe(III), Cu(II) or Mn(II) dissolved in an aqueous medium. In general, the Fenton reaction utilizes a solution of aqueous hydrogen peroxide and an iron catalyst to oxidize contaminants or waste waters. Ferrous iron (II) is first oxidized by hydrogen peroxide to ferric iron (III), a hydroxyl radical and a hydroxyl anion. Iron (III) is then reduced back to iron (II), a peroxide radical, and a proton by the same hydrogen peroxide. The reaction chemistry is as follows:

$$Fe^{2+} + H_2O_2 \rightarrow Fe^{3+} + OH \cdot + OH^- \quad (1)$$

$$Fe^{3+} + H_2O_2 \rightarrow Fe^{2+} + OOH \cdot + H^+ \quad (2)$$

In practice, the iron activates the hydrogen peroxide, creating hydroxyl radicals which are capable of oxidizing organic material found in wastewater. The Fenton process is generally efficient under acidic conditions and atmospheric pressure. In contrast, wet air oxidation reactions typically take place under elevated temperatures and pressures, where the high temperatures enhance reaction kinetics and the high pressures increase the oxidant (air or oxygen) solubility in the aqueous reaction medium. In addition, wet air oxidation involves taking oxygen from the gas phase to the liquid phase to act as a reactant.

In certain embodiments, the reaction between iodide and the source of oxygen may produce an off-gas. In at least one embodiment, the off-gas may be transferred from the reactor. In one or more aspects, the off-gas may comprise at least one of nitrogen, oxygen, iodine, and water. In another aspect, the off-gas may comprise at least one of nitrogen, oxygen, iodine species, and water. In at least one aspect, water may be recovered from the off-gas by transferring it to a scrubber. In at least one embodiment, the off-gas comprising iodine may be transferred to a scrubber. In certain aspects, iodine may be regenerated from the off-gas by treating it with a scrubber. In another aspect, the regenerated iodine from the scrubber may be re-introduced to the process system as a source of regenerated iodine. In at least one aspect, the scrubber may be fluidly connected downstream from the reactor and upstream from the source of iodine. In at least one embodiment, at least one energy recovery device may be fluidly connected downstream from the reactor and may be configured to recover thermal energy from the reactor. In certain embodiments, the energy recovery device may be a heat exchanger.

In accordance with certain embodiments, the system for treating hydrogen sulfide gas may further comprise a control system. In certain embodiments, the control system may monitor and regulate operation of one or more parameters of any unit operation or stream of the process system. In certain aspects, the control system may be utilized to perform at least one of monitoring, regulating, and adjusting operating conditions of any of the unit operations or streams of the process system based on targeted or predetermined values. The targeted or predetermined values may be selected to achieve at least one of a selected or desired product or product quality, a selected or desirable efficiency of the process system, and a selected or desired recovery rate of the one or more components, reactants, or products of the system. For example, the control system may be configured to regulate a predetermined temperature. In other examples, the control system may be configured to regulate a predetermined pressure. In some embodiments, the same or a different control system can be utilized to perform at least one of monitoring, adjusting, and regulating operating conditions in any of the unit operations of the system. For example, the flow rate of the $H_2S$ feed stream may be monitored and controlled to provide one or more predetermined, target, or set point values, or to be dependent on other operating conditions of one or more other unit operations. Other monitored or controlled parameters can be the temperature, the pressure, and the flow rates of any of the streams. The controller may be implemented using one or more computer systems, which may be, for example, a general-purpose computer or a specialized computer system.

One or more embodiments of the systems and methods described here may include one or more fluid control devices, such as pumps, valves, regulators, sensors, pipes, connectors, controllers, power sources, and any combination thereof.

FIG. 1 illustrates a process flow diagram in accordance with the methods and systems described here. The process system 10 includes contactor 101 where $H_2S$ feed stream 100, and iodine, which may be in the form of iodine-rich solution, 106 are introduced and mixed together. The iodine reacts with $H_2S$ to produce stream 104. Stream 104 may comprise at least one of elemental sulfur, iodide in the form of HI, un-reacted $I_2$, and other iodide salts. Stream 104 may then be introduced into separation device or separator 102, where elemental sulfur 120 may be precipitated off and the remaining iodide in the form of iodide solution 105, may be transferred to reactor 103, where a wet oxidation reaction occurs. Iodide solution 105 may comprise HI and other iodide salts. In certain non-limiting embodiments, iodide solution 105 may be pre-treated before being introduced to reactor 103. For example, iodide solution 105 may be pre-heated or filtered. For instance, iodide solution 105 may be heated to a temperature that is sufficient to create the desired reaction conditions to convert iodide to iodine. A source of oxygen, such as air or pure $O_2$ may be introduced to reactor 103 under aqueous conditions, for example, by introducing steam. Under conditions of high temperature and pressure, the iodide may be oxidized to iodine. The regenerated iodine-rich solution 106 may be removed from the system or may be recycled back to contactor 101. Gas effluent 122 off of the contactor may comprise $CO_2$ and off-gas from the wet oxidation reaction.

Figure 2:
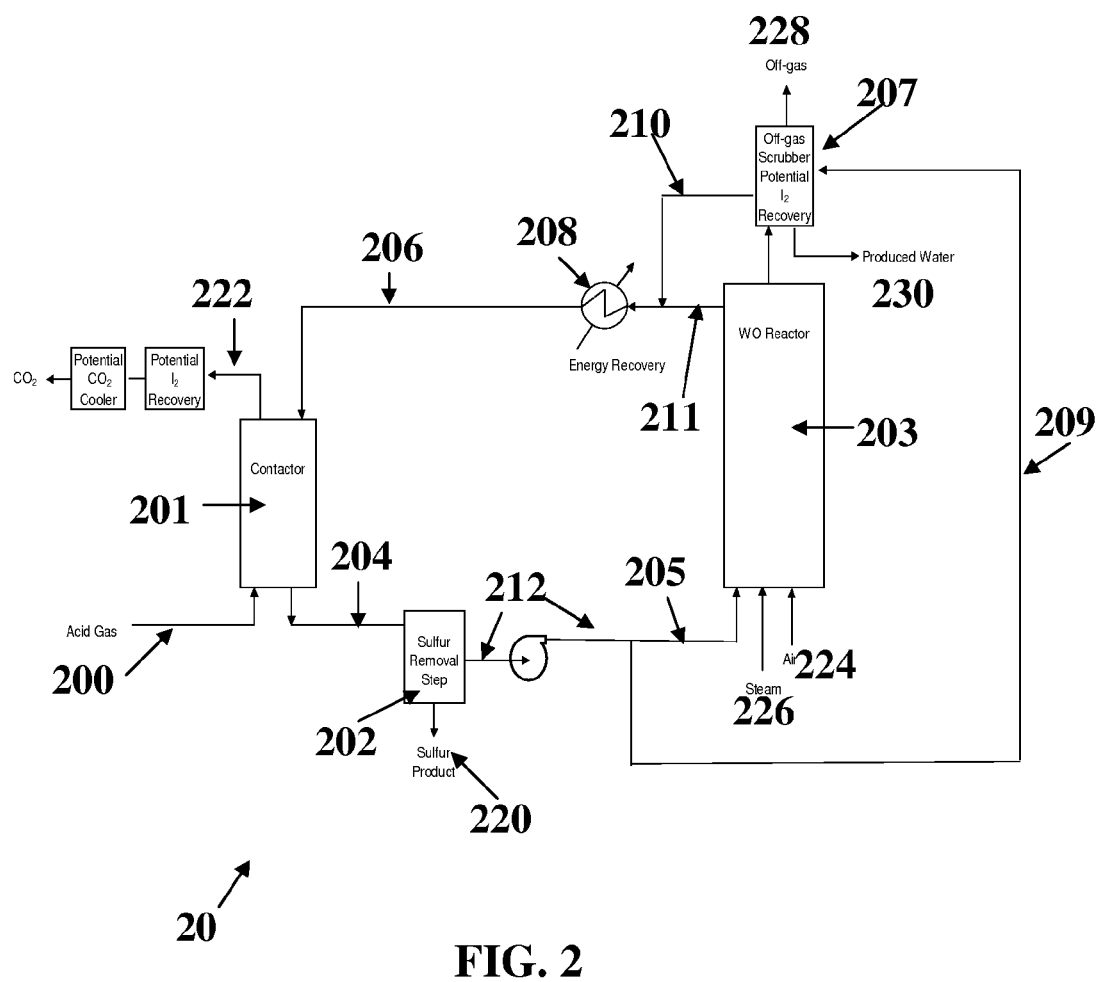
FIG. 2 is a schematic drawing of a process flow diagram in accordance with one or more aspects of the disclosure.

A process flow diagram in accordance with one or more embodiments of the methods and systems described herein is shown in FIG. 2. The process system 20 includes a contactor 201, where $H_2S$ feed stream 200 may be introduced and mixed with iodine, which may be in the form of iodine-rich solution, 206. $H_2S$ feed stream 200 may originate from one or more chemical processing facilities or oil refineries located upstream or downstream from process system 20. The $H_2S$ may be mixed with and react with $I_2$ in the contactor to produce stream 204, which exits contactor 201, and may comprise at least one of elemental sulfur, un-reacted $I_2$, iodide in the form of HI, and other iodide salts. Off-gas 222 from contactor 201 may contain at least one of un-reacted $CO_2$, iodine species, and small concentrations of impurities from original $H_2S$ feed stream 200. Off-gas 222 may be additionally treated to regenerate at least one of $I_2$ and $CO_2$. A cooler, for example, a tube-in-pipe cooler, may treat $CO_2$ contained in off-gas 222 Other suitable types of coolers may include, for example, air coolers, shell and tube coolers, thin fin, and plate and frame coolers.

Stream 204 may then be passed through separation device or separator 202, where elemental sulfur 220 may be precipitated off. The separation device may also separate two phases as liquids. The remaining portion from contactor 201 may produce stream 212, which may comprise HI and other iodide salts. A first portion of stream 212 may produce iodide solution stream 205, which may be introduced into reactor 203, where a wet oxidation reaction occurs. Air 224 and steam 226 may be introduced to reactor 203 to produce regenerated $I_2$, which may exit reactor 203 as stream 211. Regenerated iodine stream 211 may be used to comprise a portion of iodine feed stream 206. Off-gas 228, exiting from reactor 203, may contain at least one of nitrogen, un-reacted $O_2$, water produced by the reaction, and un-reacted $I_2$. Scrubber 207 may be used to regenerate additional $I_2$, in the form of regenerated iodine stream 210, which may exit scrubber 207 and may be further used to comprise a portion of iodine feed stream 206. Water 230 recovered or produced by the scrubber may exit through one or more scrubber outlets. Scrubber 207 may produce off-gas 228, comprising at least one of nitrogen, unreacted oxygen, and noncondensable gases. A second portion of iodide solution stream 212 may produce iodide solution 209, which may be transferred to scrubber 207 and may serve to aid in $I_2$ regeneration.

Additional processing or flow regulating equipment may also be placed throughout the process flow system. For example, a pump may be placed in communication with iodide solution 212. In addition, a valve device may be placed in fluid communication with iodide solution 212 to produce the appropriate proportional separation between iodide solutions 205 and 209.

The iodine regeneration reaction II is exothermic and the temperature of reactor 203 may be slightly higher than contactor 201. These conditions may provide an opportunity to recover energy from reactor 203, in the form of heat, using energy recovery device 208. Energy recovery device 208 may be positioned, for example, in fluid communication with regenerated iodine feed stream 211, exiting from reactor 203, and at least one of regenerated iodine feed stream 210, exiting from the scrubber, and iodine feed stream 206. A suitable example of energy recovery device 208, may be, but is not limited to, one or more heat exchangers.

Suitable construction materials for the process equipment, such as the contactors, separators, reactors, energy recovery devices, and pipes, include materials that are corrosion resistant and able to withstand high temperatures and pressures. Non-limiting examples of suitable materials include, but are not limited to, tantalum, titanium, including titanium grade 2, and Alloy C-276 (a nickel alloy plate available, for example, from Sandmeyer Steel Company, Philadelphia, Pa.). In addition, Teflon®-lined and glass-lined processing equipment may also be used in certain applications.

Figure 3:
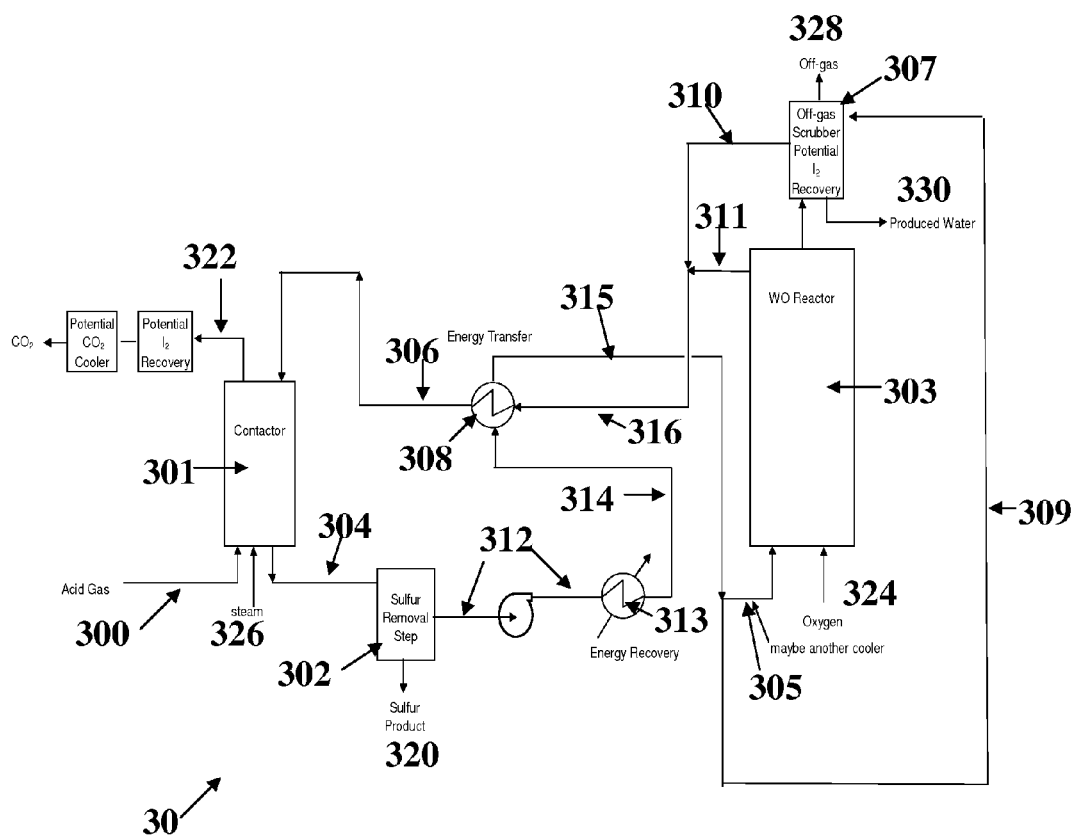
FIG. 3 is a schematic drawing of a process flow diagram in accordance with one or more aspects of the disclosure.

A process flow diagram in accordance with one or more embodiments of the methods and systems described here is shown in FIG. 3. The process equipment and chemical reactions are similar to those shown in FIG. 2, with the exception that the source of oxygen fed to reactor 303 is pure oxygen.

The process system 30 includes contactor 301, where $H_2S$ feed stream 300 may be introduced and mixed iodine, which may be in the form of iodine-rich solution, 306. Contactor 301 may be pre-heated by steam 326, to a temperature suitable for reaction conditions. $H_2S$ reacts with the $I_2$ to produce stream 304, which exits contactor 301 and may comprise at least one of elemental sulfur, iodide in the form of HI, un-reacted $I_2$, and other iodide salts. Off-gas 322 from contactor 301 may comprise at least one of un-reacted $CO_2$, species, and small concentrations of impurities from the original $H_2S$ feed stream. The off-gas may be additionally treated to regenerate at least one of $I_2$ and $CO_2$.

Stream 304 may be introduced into separation device or separator 302, where elemental sulfur 320 may be precipitated off. The remaining portion from contactor 301 may produce stream 312, which may comprise at least one of HI and other iodide salts. Iodide stream 312 may be transferred through first energy recovery device 313 to produce iodide solution 314, which may be transferred through second energy transfer device 308 to produce iodide solution 315. A first portion of iodide stream 315 produces iodide solution 305, which may be introduced into reactor 303. A second portion of iodide stream 315 produces stream 309, which may be introduced into scrubber 307. Scrubber 307 may be used to regenerate additional 12, in the form of regenerated iodine stream 310, which may exit scrubber 307 and may be further used to comprise a portion of iodine feed stream 306. Water 330 recovered or produced by the scrubber may exit through one or more scrubber outlets. Scrubber 307 may produce off-gas 328, comprising at least one of nitrogen, unreacted oxygen, and non-condensable gases. Pure oxygen 324 may be introduced to reactor 303 to produce iodine stream 311. Regenerated iodine stream 310 may combine with iodine stream 311 to produce regenerated iodine stream 316. For safety considerations, reactor 303 may not be constructed from titanium, but rather a material suitable for these particular reaction conditions, for example, Alloy C-276. In addition, the operating temperature in reactor 303 may be reduced when pure oxygen is used as the reactant for iodine regeneration. For example, contactor 301 may operate at about 120° C., and reactor 303 may operate at about 80° C. In addition, the concentration of circulated iodine solution may be reduced, and the flow rates may be increased, for example, by 70% or more.

When pure oxygen is used as the source of oxygen in reactor 303, there may be significantly less off-gas produced for subsequent treatment by scrubber 307. The off-gas may contain at least one of nitrogen, un-reacted $O_2$, water produced by the reaction, and un-reacted $I_2$. Scrubber 307 may be used to regenerate additional $I_2$, in the form of regenerated iodine stream 310, which exits scrubber 307 and may be used to comprise a portion of iodine feed streams 306 and 316. Energy transfer device 308 may be in fluid communication with iodide streams 314 and 315, as well as iodine streams 306, 310, 311, and 316.

Figure 4:
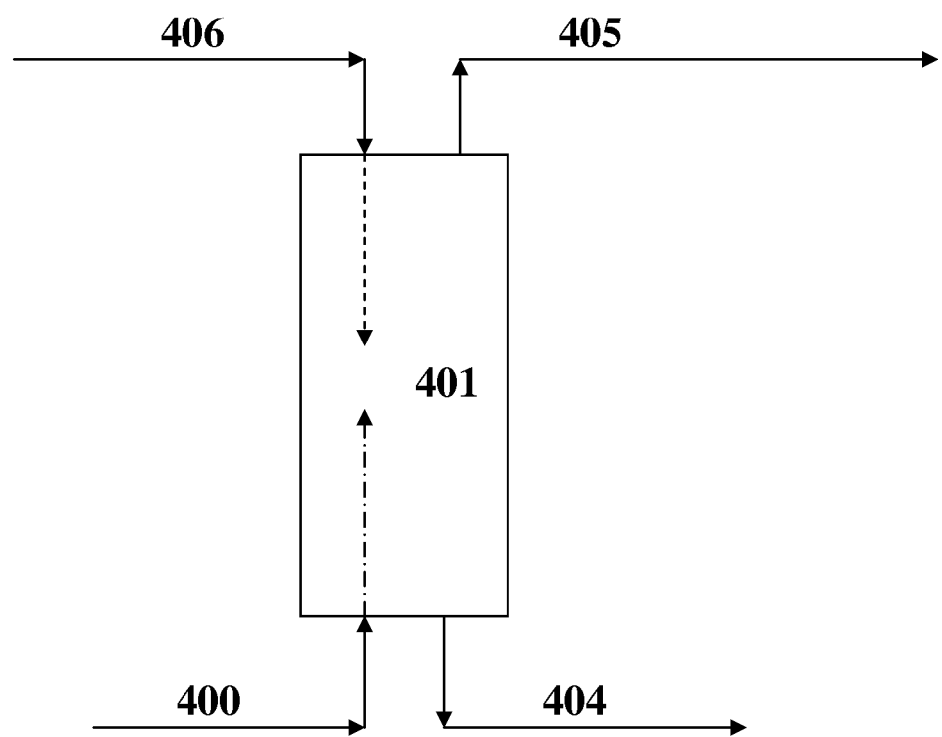
FIG. 4 is a schematic drawing of a process flow diagram in accordance with one or more aspects of the disclosure.

A process flow diagram in accordance with one or more embodiments of the systems and methods described herein is illustrated in FIG. 4. The process system 40 comprises a contactor 401 configured for a countercurrent flow pattern. The countercurrent flow pattern includes introducing $H_2S$ feed stream 400 into a bottom portion of contactor 401 and introducing iodine, which may be in the form of iodine-rich solution, 406, into a top portion or side portion of contactor 401, therefore producing the countercurrent flow. In the alternative, stream 406 may be introduced into the bottom portion of contactor 401, while $H_2S$ feed stream 400 may be fed into a top or side portion of contactor 401. Stream 406 may be pre-heated to temperatures near the operating temperature of the contactor. In addition, $H_2S$ feed stream 400 may be pre-heated before being introduced to contactor 401. If necessary, water may also be introduced to at least one of the $H_2S$ feed stream and contactor 401. The resulting reaction may produce stream 404, which may comprise at least one of sulfur and iodide, and off-gas 405.

Contactor 401 may comprise one or more baffles and may be constructed and arranged to allow separation of one or more fluid phases. Off-gas 405 from contactor 401 may comprise water vapor that may further be condensed and introduced to a scrubber to aid in $I_2$ regeneration. Stream 404 from the contactor may be further introduced to at least one of a cooler and a separation device, where elemental sulfur may be precipitated out. The remaining reactants may then be further processed by, for example, a wet oxidation reactor, or may be transferred to a scrubber.

Figure 5:
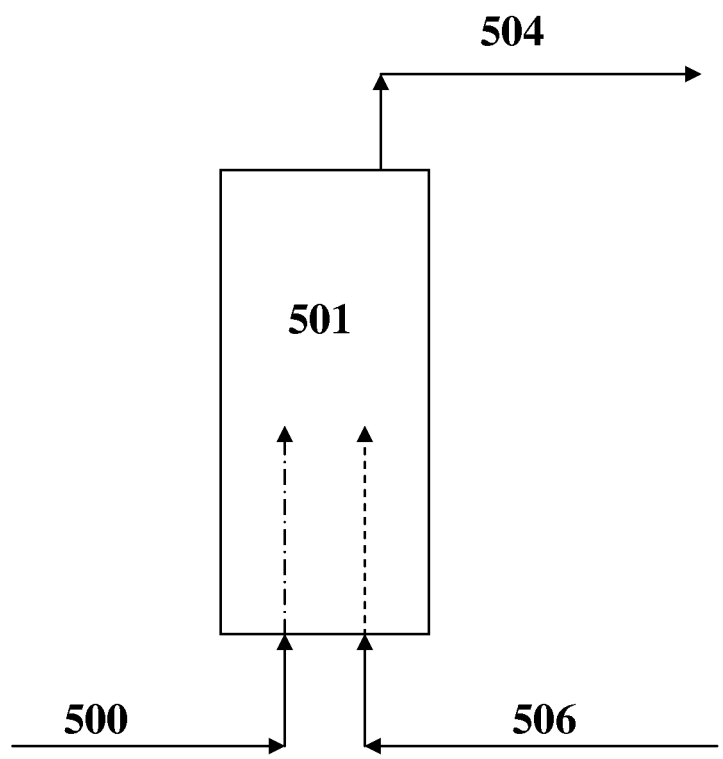
FIG. 5 is a schematic drawing of a process flow diagram in accordance with one or more aspects of the disclosure.

A process flow diagram in accordance with one or more embodiments of the systems and methods described here is illustrated in FIG. 5. The process system 50 comprises contactor 501 configured for a co-current flow pattern. The co-current flow pattern includes introducing both $H_2S$ feed stream 500 and iodine, which may be in the form of iodine-rich solution, 506, into a bottom portion of contactor 501. Both streams may be allowed to flow upward together in a co-current flow pattern. In the alternative, stream 506 and $H_2S$ feed stream 500 may be introduced into a top portion or a side portion of contactor 501. Stream 506 may be pre-heated to temperatures near the operating temperature of the contactor. In addition, $H_2S$ feed stream 500 may be pre-heated before being introduced to contactor 501.

Contactor 501 may comprise one or more baffles and may be constructed and arranged to allow separation of one or more fluid phases. The resulting off-gas and liquid reactant stream 504 may be further introduced to at least one of a cooler and a separation device. For example, the off-gas may be separated from the liquid reactant and the liquid reactant may be separated into sulfur and liquid iodide solution. The liquid iodide solution may be further processed by, for example, a wet oxidation process, or may be transferred to a scrubber. The off-gas from stream 504 may be further transferred and processed, for example, by a scrubber.

Figure 6:
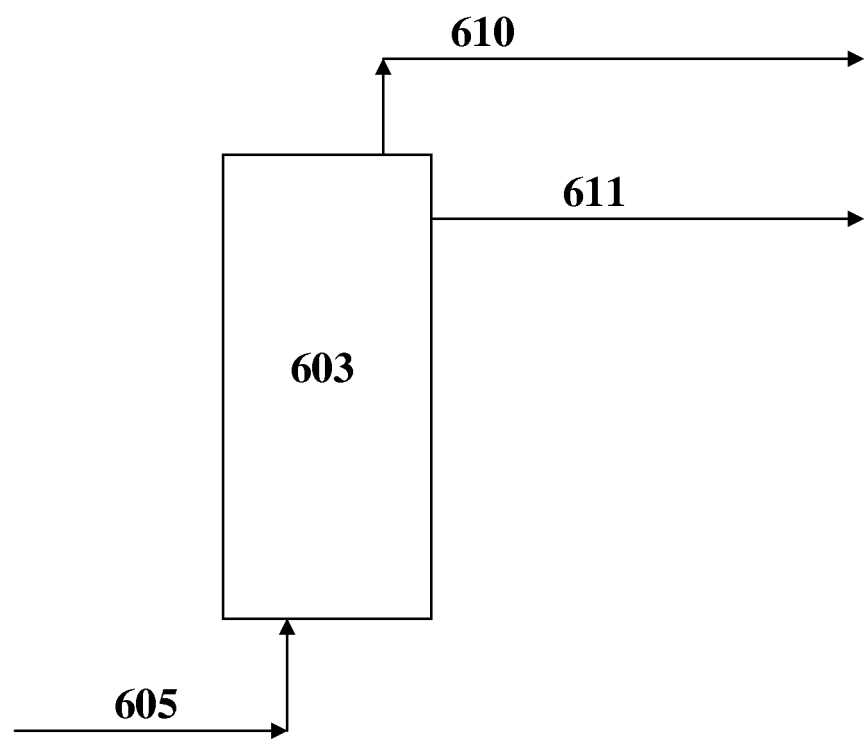
FIG. 6 is a schematic drawing of a process flow diagram in accordance with one or more aspects of the disclosure.

A process flow diagram in accordance with one or more embodiments of the systems and methods described here is illustrated in FIG. 6. The process system 60 includes a reactor 603 configured to perform a wet oxidation reaction. Feed stream 605 may comprise iodide in the form of HI solution. Feed stream 605 may further comprise a source of oxygen, such as air. Reactor 603 may be configured with one or more baffles and may be constructed and arranged to allow separation of one or more fluid phases, for example, the separation of gas and liquid phases. The wet oxidation reaction may produce iodine stream 611 and off-gas 610. Iodine stream 611 may be further introduced to an energy recovery device, for example, a heat exchanger. Iodine stream 611 may be further introduced to at least one of a cooler and a phase separator. The resulting gases may be further treated by a scrubber to regenerate additional $I_2$. Iodine stream 611 may be further introduced to a downstream process, for example, to a contactor, to react with $H_2S$ gas. Off-gas stream 610 may comprise water vapor that may be further condensed and introduced, for example, to a scrubber.

EXAMPLES

The systems and methods described herein will be further illustrated through the following examples, which are illustrative in nature and are not intended to limit the scope of the disclosure.

Example 1

Iodide Conversion to Iodine

A test was performed to evaluate the conversion of iodide and organic iodine compounds into elemental iodine. Testing was performed in a shaking autoclave.

The test conditions and results are presented in Table 1 below.

|  | Feed | Reactant | Reactant |
|---|---|---|---|
| Temperature (° C.) | — | 240 | 260 |
| Oxygen Source | — | Air | Air |
| Reaction Time (min) | — | 60 | 60 |
| Analysis | | | |
| pH | 0.16 | 1.34 | 1.34 |
| Iodide Salts (mg/L) | 880 | 86 | 52 |
| Iodine (mg/L) | — | 2110 | 2200 |
| Organic Iodine Compounds (CH$_3$I) | 1880 | — | 30 |

— indicates no reportable results

The results indicated that conversion of iodide salts and organic iodine compounds can be accomplished using a wet oxidation process as described herein.

Example 2

Removal of Sulfur from Acid Gas

A test was performed to evaluate the removal of sulfur from a gas comprising $H_2S$. An iodine-rich solution was placed into an impinger or contactor and a gas containing $H_2S$ was bubbled through it. Yellow sulfur solids were observed in the solution after a short period of time. The presence of precipitated elemental sulfur therefore showed the feasibility of eliminating the Claus process for removing $H_2S$ from a gas stream and replacing the process by using the systems and methods described herein.

Although the examples show the use of iodine to react with $H_2S$ to produce sulfur, it is within the scope of the methods and systems described herein to use other suitable compounds that are capable of functioning as oxidizers and being regenerated, for example, by a wet oxidation process. Non-limiting examples of other compounds that may be suitable to use, include, but are not limited to, chlorine, bromine, manganese, vanadium, and fluorine.

Example 3

Removal of Sulfur from Acid Gas

A treatment system in accordance with one or more embodiments of the systems and methods described here was evaluated for performance. A bench scale acid gas treatment with iodine was conducted under a number of different test conditions.

Testing was performed in a Parr stirred autoclave fitted with titanium internals and head. The body was constructed of glass and had a volume of 600 mL. The autoclave was equipped with a variable speed mixer and configured with multiple ports on the top to aid in at least one of injecting feed gases and venting reaction gases. Feed liquid was tested on a batch basis and test gases were tested on a flow-through basis.

The procedure for testing was as follows: (1) Introduce starting liquid to the autoclave, (2) Close autoclave and attach heating mantel to autoclave exterior, (3) Connect feed gas sources, (4) Start mixer, (5) Start temperature and pressure controls, (6) Start heater, (7) Start feed gas flows, (8) After testing time period has elapsed, stop the gas flows, (9) Cool and depressurize the system, and (10) Recover the test solution and submit for analysis.

A titanium autoclave was modified to function as a separator. Nozzle connections were fitted to the top and bottom of the autoclave. Feed was introduced from the side and any condensate that formed descended to the bottom. The remaining components exited the separator and flowed to a cooler.

A caustic scrubber was constructed of PVC. Off-gas passed upward through the scrubber where it was scrubbed with a 10% wt. caustic solution (NaOH) to aid in capturing any un-reacted $H_2S$. The scrubber was constructed to accommodate one liter of 10% caustic solution and additionally contained a plastic packing material to increase the surface area of the gas/liquid interface.

Off-gas from the autoclave was cooled by a tube-in-pipe cooler, which was constructed with an outer jacket and a tube or pipe of smaller diameter and constructed of titanium. Cooling water flowed in the outer tube counter-current to the off-gas flow. The outlet off-gas temperature was monitored by a thermocouple and recorded by a laptop programmable logic controller (PLC).

Rheotherm gas flow meters were used to monitor gas flow rates of the $H_2S$ feed stream, the air and nitrogen feeds to the autoclave, and the purge nitrogen to the separator. The gas flow meters were connected to a laptop PLC system, where gas flow rates were recorded.

The $H_2S$ feed stream flow rate was controlled by a remotely operated needle valve and a block valve. The air and nitrogen feed gas flow rates were controlled by a needle valve. A Dresser Masoneilan® pressure control valve was used to control pressure in the autoclave using a Fisher® controller.

The $H_2S$ feed stream composition was 66% $H_2S$ and 34% $CO_2$. The mixer speed was set at 1700 rpm. Listed below in Table 2 are the test condition descriptions and details.

TABLE 2

Acid Gas Treatment with Iodine

| Test Condition | Condition Details | Reactor Temp./ Pressure (° C./ psi) | Feed gas flow rate (lb/h) | Iodine Additive | Reaction Time (min.) | Gas/ Flow rate (lb/h) |
|---|---|---|---|---|---|---|
| 1 | Initial analysis to determine if $I_2$ treats acid gas | 21/127 | 0.035 | 298 mL of 20 g/L $I_2$ | 60 | $N_2$/0.410 |
| 2 | Repeat condition 1, reduce reaction time | 18/125 | 0.038 | 300 mL of 20 g/L $I_2$* | 15 | $N_2$/0.434 |
| 3 | Repeat condition 2 with 40 g/L $I_2$/$I^-$ mixture | 18.5/130 | 0.035 | 300 mL of 26.7 g/L $I_2$, 17.3 g/L $I^-$ (KI)* | 15 | $N_2$/0.403 |
| 4 | Repeat condition 2 with 100 g/L $I_2$/$I^-$ mixture | 20/135 | 0.035 | 300 mL of 66.7 g/L $I_2$, 44.3 g/L $I^-$ (KI)* | 15 | $N_2$/0.45 |
| 5 | Repeat condition 4, increase temp. to 125° C. | 125/125 | 0.035 | 290 mL of 66.7 g/L $I_2$, 40 g/L $I^-$ (NaI) | 15 | $N_2$/0.44 |
| 6 | Repeat condition 5, add Air | 125/131 | 0.036 | 300 mL of 66.7 g/L $I_2$, 40 g/L $I^-$ (NaI)* | 30 | Air/0.45 |
| 7 | Repeat condition 6, with 100 g/L $I_2$/$I^-$ mixture | 125/128 | 0.036 | 275 mL of 13.3 g/L $I_2$, 8.0 g/L $I^-$ (NaI) | 30 | Air/0.45 |
| 8 | Repeat condition 5, reduce temperature | 105/125 | 0.034 | 300 mL of 13.3 g/L $I_2$, 40.0 g/L $I^-$ (NaI) | 15 | $N_2$/0.45 |
| 9 | Repeat condition 5, with one minute acid gas residence time | 125/135 | 0.034 | 435 mL of 66.7 g/L $I_2$, 40 g/L $I^-$ (NaI) | 22 | $N_2$/0.44 |
| 10 | Repeat condition 5, reduce reaction time. | 125/135 | 0.070 | 285 mL of 66.7 g/L $I_2$, 40.0 g/L $I^-$ (NaI) | 7 | $N_2$/0.73 |
| 11 | Repeat condition 5, increase temp. to 150° C. | 150/132 | 0.036 | 275 mL of 66.7 g/L $I_2$, 40.0 g/L $I^-$ (NaI) | 15 | $N_2$/0.45 |
| 12 | Repeat condition 5 with 100 g/L $KIO_3$ (iodate) | 125/130 | 0.035 | 290 mL of 100 g/L $KIO_3$, 20 g/L $NaHCO_3$ | 15 | $N_2$/0.44 |
| 13 | Repeat condition 5, reduce reaction time | 150/130 | 0.034 | 275 mL of 66.7 g/L $I_2$, 40.0 g/L $I^-$ (NaI) | 10 | $N_2$/0.45 |

*Calculated result; no measurements taken.

Initial test reactions were performed at room temperature (20° C.) using iodine in water. The system was nitrogen blanketed so that iodine was the only reactant in the system. The initial test runs resulted in high quantities of sulfur in the scrubber, indicating low acid gas conversion. This may have been due to deficient levels of iodine being available in the solution.

Additional test reactions were performed where iodine was added with iodide (as KI or NaI) to form the soluble $I_3^-$ complex. When a sufficient amount of iodine was added to stoichiometrically treat all acid gas added to the system, no sulfur was detected in the scrubber, indicating a high degree of acid gas conversion. The sulfur produced also contained iodine.

Further testing was performed where the temperature of the reaction vessel was increased to 125° C. or greater. This temperature range is above both the melting point of sulfur (115° C.) and iodine (114° C.). Under these conditions, no detectable sulfide or other sulfur compounds were detected in the scrubber, indicating that >99% of the sulfur added to the system was removed from the gas and converted to elemental sulfur. The sulfur produced was a solid consisting of fine yellow particles that settled quickly and appeared to be of high quality. This testing showed the superiority of the methods and systems of the present disclosure over the Clause process.

In addition to the elemental sulfur, small amounts of sulfate ($H_2SO_4$) were formed, with concentrations ranging from 90-600 mg/L, depending on the specific test condition. In general, an increase in temperature also resulted in an increase in the concentration of sulfate in the effluent. Of the soluble sulfur compounds, sulfate was found to be the major contributor, with other soluble sulfur compounds, such as sulfide, being minor contributors. Due to its corrosive nature, reaction conditions may be tailored, for example, by keeping temperatures in a certain range, or below a certain target temperature, in order to minimize the formation of $H_2SO_4$. In the alternative, if the formation of $H_2SO_4$ is desirable, then the reaction conditions may be altered, for example, by increasing the temperature, to increase the formation of $H_2SO_4$. Listed below in Table 3 are the test results.

TABLE 3

Results from Acid Gas Treatment with Iodine

| Test Condition | $H_2S$ Added (mg) | Scrubber Effluent Total Sulfur (mg) | Scrubber Effluent Sulfide (mg) | Percent Sulfur Removed from $H_2S$ feed stream |
|---|---|---|---|---|
| 1 | 9300 | 7510 | 7460 | 19.2% |
| 2 | 2400 | 1760 | 1530 | 26.7% |
| 3 | 2100 | 981 | 917 | 53.3% |
| 4 | 1900 | 90 | <30 | 95.3% |
| 5 | 2000 | <10 | <30 | 99.5% |
| 6 | 4500 | <10 | <30 | 99.8% |
| 7 | 4400 | 2950 | 2640 | 33.0% |
| 8 | 2100 | <10 | <30 | 99.5% |
| 9 | 3300 | <5 | <30 | 99.8% |
| 10 | 1800 | <5 | <30 | 99.7% |
| 11 | 1900 | 155 | 128 | 91.8% |
| 12 | 2100 | 184 | 68 | 91.2% |
| 13 | 1300 | 5.2 | <30 | 99.6% |

The bench scale acid gas treatment tests indicated that utilizing iodine (as the $I_3^-$ complex regenerated by the WAO process) was sufficient for treating acid gas at a temperature of 125° C. and a pressure of 135 psi. These conditions yielded concentrations of sulfur in the scrubber that were less than 10 mg/L, indicating >99% conversion. In addition, the sulfur produced appeared to be of high quality. The conversion reaction also produced a small concentration of sulfuric acid. These results indicate that a very high conversion can be achieved, further reinforcing the superiority of the methods and systems of the present disclosure over the Clause process.

Example 4

Regeneration of Iodine

A treatment system in accordance with one or more embodiments of the systems and methods described here was evaluated for performance. A bench scale iodide regeneration treatment was conducted under a number of different test conditions.

Testing was performed in the Parr stirred autoclave, as described in Example 3, as well as a shaking autoclave. Listed below in Table 4 are the test condition descriptions and details.

TABLE 4

Iodide Regeneration using Wet Oxidation Process

| Test Condition | Condition Details | Reaction Temp./Pressure (° C.)/(psi) | Gas/Flow rate (lb/h) | Reaction Time (min.) | Reactant |
|---|---|---|---|---|---|
| 1 | Initial analysis to determine conditions required for regeneration of $I_2$ | 125/135 | Air/0.45 | 15 | 100 g/L $I^-$ (as KI) |
| 2 | Repeat condition 1, increase temp. to 150° C. | 150/135 | Air/0.45 | 15 | 100 g/L $I^-$ (as KI) |
| 3 | Repeat condition 2, increase reaction time | 150/135 | Air/0.45 | 60 | 100 g/L $I^-$ (as KI) |
| 4 | Repeat condition 1, use spent iodine solution from prior treatment with acid gas | 125/135 | Air/0.45 | 15 | 100 g/L $I^-$ |
| 5 | Repeat condition 4, increase temp. to 150° C. | 150/135 | Air/0.45 | 15 | 100 g/L $I^-$ |
| 6 | Repeat condition 5, increase pressure | 150/195 | Air/0.45 | 15 | 89 g/L $I^-$ |
| 7 | Repeat condition 6, determine iodine balance | 150/200 | Air/0.45 | 15 | 96.8 g/L $I^-$ |

TABLE 4-continued

Iodide Regeneration using Wet Oxidation Process

| Test Condition | Condition Details | Reaction Temp./ Pressure (° C.)/ (psi) | Gas/Flow rate (lb/h) | Reaction Time (min.) | Reactant |
|---|---|---|---|---|---|
| 8 | Repeat condition 6, increase I$^-$ concentration | 150/200 | Air/0.45 | 15 | 155 g/L I$^-$ |

Iodine regeneration tests were performed both in the shaking autoclave as well as the semi-batch stirred autoclave. From these tests, it was found that iodine could be regenerated with temperatures as low as 80° C. and 15 minute residence times. In general, the regeneration of I$^-$ to I$_2$ was approximately 50% (the theoretical maximum for I$_2$ conversion is 67%). At higher temperatures and pressures, the conversion was more complete. In addition, higher pressures had a more significant impact at lower temperatures than at higher temperatures. For example, it is projected that at a reaction temperature of 80° C., pressures of 400 psi or greater would likely be required.

The results of at least one test condition indicated that in order for sufficient regeneration to occur, the solution must contain at least 67% of the total I$^-$ species, meaning NaI, KI, and HI as HI. The I$^-$ would not regenerate in any sufficient quantity if it was present only as NaI or KI without the addition of the acid. In other embodiments, it may be possible to utilize a solution containing species that may be converted to at least about 67% HI with, for example, the addition of HI. The additional 33% of the I$^-$ in solution can remain as at least one of HI, KI, and NaI, and will not affect the regeneration since only the I$^-_3$ complex is formed. Listed below in Table 5 are the test results.

TABLE 5

Results from Iodide Regeneration using Wet Oxidation Process

| Test Condition | Reactor Effluent Volume (mL) | Reactor Effluent I$^-$ (mg) | Reactor Effluent I$^-$ + I$_2$ (mg) | Reactor Effluent I$_2$ (calculated) (mg) | % I$_2$ Regenerated | Comment |
|---|---|---|---|---|---|---|
| 1 | — | — | — | — | — | No iodine regeneration occurred. |
| 2 | — | — | — | — | — | No iodine regeneration occurred. |
| 3 | — | — | — | — | — | No iodine regeneration occurred. |
| 4 | 285 | 18582 | 28757 | 10175 | 35 | Regeneration successful. |
| 5 | 275 | 15070 | 26620 | 11550 | 43 | The increase in temperature increased regeneration of iodine. |
| 6 | 285 | 11913 | 25337 | 13424 | 53 | The increase in pressure increased regeneration of iodine. |
| 7 | 300 | 13830 | 28260 | 14430 | 51 | The regeneration of iodine at 150° C. and 200 psi is approximately 50%. |
| 8 | 285 | 21375 | 44745 | 23370 | 52 | A higher concentration of iodide did not substantially affect the regeneration of iodine. |

— indicates no importable results

Example 5

Multiple Cycle Evaluation

A treatment system in accordance with one or more embodiments of the systems and methods described here was evaluated for performance. A bench scale multiple cycle treatment was conducted under a number of different test conditions.

The equipment used was identical to the equipment used in Examples 3 and 4, with the exception that a second cooler was placed and configured in a vertical orientation at a location directly above the autoclave. The second cooler functioned to condense gaseous iodine and recycle it back into the autoclave. Repeated cycles included reacting gas comprising $H_2S$ with iodine followed by iodine regeneration. The cycles were performed multiple times in succession to confirm that system efficacy was intact without the formation of additional compounds. Testing was performed with a maximum of five complete oxidation and regeneration cycles. Listed below in Table 6 are the test condition descriptions and details,

TABLE 6

Multiple Cycle Analysis

| Test Condition | Condition Details | Temp./ Pressure (° C.)/ (psi) | Gas | Reaction Time (min.) (For oxidation and regeneration) |
|---|---|---|---|---|
| 1 | Initial analysis to determine if any specific compounds increase in concentration; 3 cycles | 125/135 | $N_2$/Air | 15 |
| 2 | Repeat condition 1, increase temp. to 150° C.; 5 cycles | 150/135 | $N_2$/Air | 15 |
| 3 | Repeat condition 2, increase pressure to 200 psi; 6 cycles (last cycle did not have regeneration) | 150/200 | $N_2$/Air | 15 |

The test results indicated that there was little or no decrease in the treatment capacity of the iodine, indicating that recycle in a full-scale iodine recycle system is possible. However, the amount of sulfate (as sulfuric acid) did increase through multiple steps, with higher concentrations at higher temperatures. This indicated that a sulfate removal process may be required in a full-scale system. Listed below in Table 7 are the test results:

TABLE 7

Multiple Cycle Analysis Test Results

| Source | Analysis Results | Test Condition 1 | Test Condition 2 | Test Condition 3 |
|---|---|---|---|---|
| Autoclave Effluent | Total Sulfur (mg) | 193* | — | 932 |
| | Sulfate (mg) | 162 | — | 938 |
| | Suspended Solids (mg) | 83 | — | — |
| | Iodide (mg) | 18,126 | — | — |
| | Iodide + Iodine (mg) | 25,732 | — | 19,280 |
| | Calculated Iodine (mg) | 7,606 | — | — |
| Separator Condensate | Iodide + Iodine (mg/L) | 8,330 | — | — |
| Scrubber Solution | Total Sulfur (mg) | 840 | — | 840 |
| | Sulfide (mg) | 852 | — | 2222 |
| | Autoclave (mL) | 265 | 110 | 200 |
| | Separator (mL) | 35 | 180 | 100 |
| | Scrubber (mL) | 1000 | — | 1000 |

*Total sulfur added to system could not be determined
— indicates no reportable results Results from the testing indicated that iodine was present in the off-gas tubing exiting the reaction vessel. This occurred during both the oxidation and the regeneration process, and indicates that small concentration of iodine is volatile. A scrubber may therefore be necessary to regenerate the iodine.

Additional testing was performed with iodate as the oxidizer and the results indicated that the use of iodate was not as effective as iodine in treating acid gas. In addition, sufficient regeneration of the iodate did not occur with WAO regeneration temperatures as high as 300° C.

Results from additional testing also indicated that the presence of additional additives that are capable of raising the pH, for example, ammonia, mono-ethanol amine, or phosphate, were found to interfere with the regeneration of iodine.

While exemplary embodiments of the disclosure have been disclosed many modifications, additions, and deletions may be made therein without departing from the spirit and scope of the disclosure and its equivalents, as set forth in the following claims.

Those skilled in the art would readily appreciate that the various parameters and configurations described herein are meant to be exemplary and that actual parameters and configurations will depend upon the specific application for which the systems and methods directed toward hydrogen sulfide treatment of the present disclosure are used. Those skilled in the art will recognize, or be able to ascertain using no more than routine experimentation, many equivalents to the specific embodiments described herein. For example, those skilled in the art may recognize that the apparatus, and components thereof, according to the present disclosure may further comprise a network of systems or be a component of a hydrogen sulfide treatment system. It is, therefore, to be understood that the foregoing embodiments are presented by way of example only and that, within the scope of the appended claims and equivalents thereto, the disclosed hydrogen sulfide treatment systems and methods may be practiced otherwise than as specifically described. The present apparatus and methods are directed to each individual feature or method described herein. In addition, any combination of two or more such features, apparatus or methods, if such features, apparatus or methods are not mutually inconsistent, is included within the scope of the present disclosure.

Further, it is to be appreciated various alterations, modifications, and improvements will readily occur to those skilled in the art. Such alterations, modifications, and improvements are intended to be part of this disclosure, and are intended to be within the spirit and scope of the disclosure. For example, an existing facility may be modified to utilize or incorporate any one or more aspects of the disclosure. Thus, in some cases, the apparatus and methods may involve connecting or configuring an existing facility to comprise a hydrogen sulfide treatment process. Accordingly, the foregoing description and drawings are by way of example only. Further, the depictions in the drawings do not limit the disclosures to the particularly illustrated representations.

What is claimed is:

1. A method for treating hydrogen sulfide gas, comprising:
reacting hydrogen sulfide gas with iodine to produce a stream comprising iodide and sulfur;
removing sulfur from the stream to produce a separated stream comprising iodide; and
reacting the separated stream comprising iodide with a source of oxygen under aqueous conditions and at a predetermined temperature and a predetermined pressure to produce a stream comprising iodine.

2. The method of claim 1, further comprising recovering at least a portion of the iodine from the stream comprising iodine.

3. The method of claim 2, further comprising introducing at least a portion of the regenerated iodine to the hydrogen sulfide gas.

4. The method of claim 1, further comprising recovering elemental sulfur from the stream comprising iodide and sulfur.

5. The method of claim 1, wherein the source of oxygen is air.

6. The method of claim 1, wherein the predetermined temperature is in a range of from about 75° C. to about 260° C.

7. The method of claim 6, wherein the predetermined temperature is in a range of from about 120° C. to about 175° C.

8. The method of claim 1, wherein the predetermined pressure is in a range of from about 25 psi to about 2000 psi.

9. The method of claim 8, wherein the predetermined pressure is in a range of from about 100 psi to about 400 psi.

10. The method of claim 1, further comprising reacting the separated stream comprising iodide with a source of oxygen under aqueous conditions for a time period in a range of from about 15 minutes to about 120 minutes.

11. The method of claim 10, wherein the time period is less than about 15 minutes.

12. The method of claim 1, further comprising recovering thermal energy from the stream comprising iodine.

13. A system for treating hydrogen sulfide gas, comprising:
   a contactor fluidly connected to a source of hydrogen sulfide gas and a source of iodine;
   a separator fluidly connected downstream from the contactor and configured to separate elemental sulfur and iodide; and
   a wet air oxidation reactor fluidly connected downstream from the separator and the separated iodide and fluidly connected to a source of oxygen.

14. The system of claim 13, further comprising a control system configured to regulate a predetermined temperature and predetermined pressure of the wet air oxidation reactor.

15. The system of claim 13, further comprising at least one scrubber fluidly connected downstream from the wet air oxidation reactor and upstream from the source of iodine.

16. The system of claim 13, further comprising at least one energy recovery device fluidly connected downstream from the wet air oxidation reactor and upstream from the contactor and configured to recover thermal energy from the wet air oxidation reactor.

17. The system of claim 13, further comprising a wet air oxidation reactor outlet fluidly connected upstream from the contactor and configured to transfer at least a portion of regenerated iodine from the wet air oxidation reactor to the contactor.

18. The system of claim 17, wherein the rate of regeneration from iodide to regenerated iodine from the wet air oxidation reactor is at least 50%.

19. The system of claim 13, further comprising a scrubber fluidly connected downstream from the wet air oxidation reactor and configured to transfer at least a portion of regenerated iodine from the wet air oxidation reactor to the contactor.

20. The system of claim 13, further comprising at least one energy recovery device fluidly connected downstream from the separator and upstream from the wet air oxidation reactor.

* * * * *